United States Patent
Toyota et al.

(10) Patent No.: US 10,458,545 B2
(45) Date of Patent: Oct. 29, 2019

(54) CONTINUOUSLY VARIABLE TRANSMISSION AND CONTROL METHOD THEREOF

(71) Applicant: Nissan Motor Co., Ltd., Kanagawa (JP)

(72) Inventors: Ryohey Toyota, Kanagawa (JP); Hiromu Terai, Kanagawa (JP); Tomoyuki Nakano, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/322,574

(22) PCT Filed: Aug. 4, 2016

(86) PCT No.: PCT/JP2016/072959
§ 371 (c)(1),
(2) Date: Feb. 1, 2019

(87) PCT Pub. No.: WO2018/025372
PCT Pub. Date: Feb. 8, 2018

(65) Prior Publication Data
US 2019/0203833 A1    Jul. 4, 2019

(51) Int. Cl.
| | | |
|---|---|---|
| *F16H 61/662* | (2006.01) | |
| *F16H 9/18* | (2006.01) | |
| *F16H 61/00* | (2006.01) | |
| *F16H 63/06* | (2006.01) | |

(52) U.S. Cl.
CPC ............ *F16H 61/662* (2013.01); *F16H 9/18* (2013.01); *F16H 61/0031* (2013.01); *F16H 63/065* (2013.01); *F16H 2061/66286* (2013.01)

(58) Field of Classification Search
CPC ..... F16H 61/66272; F16H 2061/66286; F16H 61/66259; Y10T 477/624; Y10T 477/6243
USPC ........................................................... 474/28
See application file for complete search history.

(56) References Cited

U.S. PATENT DOCUMENTS

| | | | | |
|---|---|---|---|---|
| 5,108,348 A | * | 4/1992 | Bornmann | ........ F16H 61/66272 474/18 |
| 5,295,915 A | * | 3/1994 | Friedmann | .............. F16H 59/14 474/18 |
| 5,971,876 A | * | 10/1999 | Spiess | ..................... F16H 61/12 474/28 |

(Continued)

FOREIGN PATENT DOCUMENTS

| | | |
|---|---|---|
| JP | S63-222942 A | 9/1988 |
| JP | 2001-330112 A | 11/2001 |
| JP | 2008-240894 A | 10/2008 |

*Primary Examiner* — Henry Y Liu
(74) *Attorney, Agent, or Firm* — Osha Liang LLP

(57) ABSTRACT

A continuously variable transmission has a primary pulley hydraulic chamber, a secondary pulley hydraulic chamber, a first oil passage connected to the secondary pulley hydraulic chamber, a second oil passage connected to the primary pulley hydraulic chamber, the second oil passage branching from the first oil passage, an electric oil pump provided on the second oil passage so as to allow oil to flow into and flow out from the primary pulley hydraulic chamber, and an oil discharge mechanism configured to discharge oil outside the second oil passage, the oil being to be supplied to the primary pulley hydraulic chamber by the electric oil pump.

8 Claims, 8 Drawing Sheets

(56) References Cited

U.S. PATENT DOCUMENTS

| | | | | |
|---|---|---|---|---|
| 6,287,227 B1* | 9/2001 | Vahabzadeh | ...... | F16H 61/66259 |
| | | | | 474/18 |
| 6,739,994 B1* | 5/2004 | Van Rooij | ........... | F16H 61/0031 |
| | | | | 474/18 |
| 6,890,275 B1* | 5/2005 | Piepenbrink | ...... | F16H 61/66263 |
| | | | | 474/18 |
| 7,955,202 B2* | 6/2011 | Wagner | ................... | F16H 61/12 |
| | | | | 474/28 |
| 8,133,141 B2* | 3/2012 | Kremer | ................ | F16H 63/065 |
| | | | | 474/18 |
| 8,857,382 B2* | 10/2014 | Yagasaki | ............. | F16H 61/0025 |
| | | | | 123/2 |
| 9,816,610 B2* | 11/2017 | Van Rooij | ......... | F16H 61/66259 |
| 2010/0035721 A1* | 2/2010 | Rothenbuhler | ......... | F16H 59/40 |
| | | | | 477/45 |
| 2012/0122628 A1* | 5/2012 | Frank | ...................... | B60K 6/36 |
| | | | | 477/3 |

* cited by examiner

CONTINUOUSLY VARIABLE TRANSMISSION AND CONTROL METHOD THEREOF

BACKGROUND

Technical Field

The present invention relates to a continuously variable transmission and a control method thereof.

Related Art

JP2008-240894A discloses a hydraulic circuit of a continuously variable transmission including a first oil pump for drawing oil from an oil pan to generate a line pressure, and a second oil pump which is provided between a primary pulley and a secondary pulley to regulate the flowing-in and flowing-out of oil with respect to a primary pulley hydraulic chamber. In the hydraulic circuit disclosed in JP2008-240894A, the second oil pump is interposed on the oil passage for speed change which communicates between the primary pulley and the secondary pulley, and which is connected to an oil passage serving as a line pressure. According to the hydraulic circuit disclosed in JP2008-240894A, the rotation direction of the second oil pump is controlled to regulate the flowing-in and flowing-out of oil with respect to the primary hydraulic chamber, thereby enabling to regulate oil volume to be supplied to the primary pulley and the secondary pulley.

SUMMARY OF INVENTION

In the hydraulic circuit disclosed in JP2008-240894A, oil needs to be supplied to the oil passage for speed change so that speed change control is performed. When the flowing-in and flowing-out of oil with respect to the hydraulic chamber of each of the pulleys is regulated, the piston provided in the cylinder connected to each of the pulleys is operated. However, since there is a gap between the cylinder and the piston, oil leaks from the hydraulic circuit. Therefore, the oil pump is driven, whereby oil of the leakage volume is enabled to be compensated.

The oil pump has a lower limit flow volume according to a controllable lower limit rotation speed of a motor for driving the oil pump. Therefore, in the case where the flow volume of oil of leakage from the hydraulic circuit is small, the oil flow volume to be compensated may be less than the lower limit flow volume. In such a case, even though the flow volume of oil of leakage is to be compensated, oil of a volume more than the flow volume is supplied. For this reason, the flowing-in and flowing-out of oil with respect to the primary hydraulic chamber is not properly regulated, whereby the speed ratio in the continuously variable transmission is not enabled to be controlled to a desired value.

One or more embodiments of the present invention provides a continuously variable transmission capable of suppressing deterioration in control accuracy of a speed ratio.

DETAILED DESCRIPTION

Embodiments of the present invention will be described below with reference to the accompanying diagrams. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
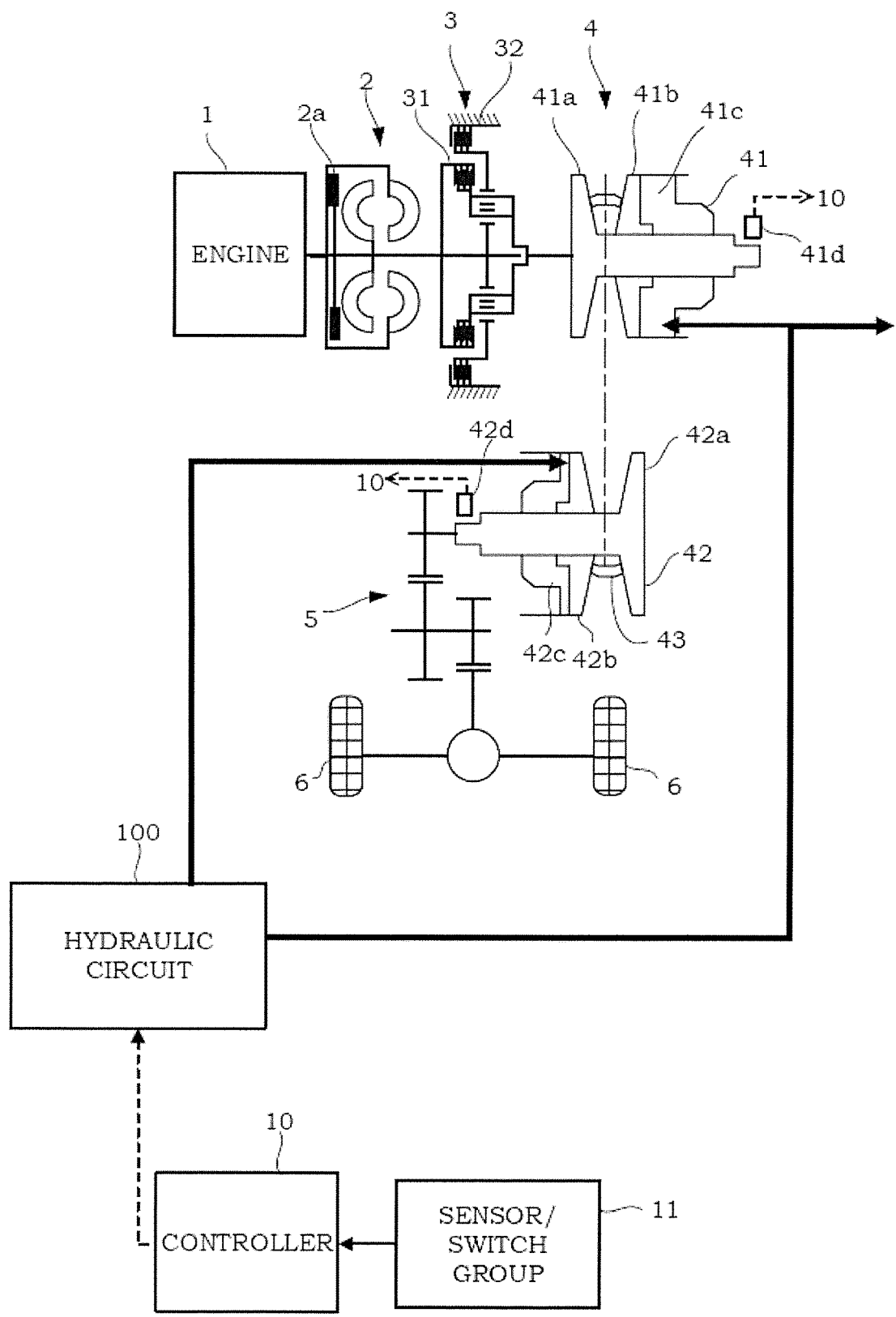
FIG. 1 is a schematic configuration diagram of a vehicle.

FIG. 1 is a schematic configuration diagram of a vehicle. The vehicle includes an engine 1, a torque converter 2 with a lock-up clutch 2a, a forward/reverse switching mechanism 3, a variator 4, a final reduction mechanism 5, a drive wheel 6, and a hydraulic circuit 100.

The engine 1 is included in a driving source of the vehicle. The output by the engine 1 is transmitted to the drive wheel 6 via the torque converter 2, the forward/reverse switching mechanism 3, the variator 4, and the final reduction mechanism 5. Therefore, the variator 4, together with the torque converter 2, the forward/reverse switching mechanism 3, and the final reduction mechanism 5, is provided on the driving-force transmitting path for transmitting driving force from the engine 1 to the drive wheel 6.

The forward/reverse switching mechanism 3 is provided between the torque converter 2 and the variator 4 on the above-described driving-force transmitting path. The forward/reverse switching mechanism 3 switches the input rotation direction between the normal rotation direction corresponding to forward traveling and the reverse rotation direction corresponding to backward traveling.

Specifically, the forward/reverse switching mechanism 3 includes a forward clutch 31 and a reverse clutch 32. The forward clutch 31 is engaged in the case where a rotation direction corresponds to the normal rotation direction. The reverse clutch 32 is engaged in the case where a rotation direction corresponds to the reverse rotation direction. One of the forward clutch 31 and the reverse clutch 32 may be configured as a clutch for engaging and disengaging the rotation between the engine 1 and the variator 4.

The variator 4 has a primary pulley 41, a secondary pulley 42, and a belt 43 wound around the primary pulley 41 and the secondary pulley 42. Hereinafter, the terminology of primary is also abbreviated as PRI, and the terminology of secondary is also abbreviated as SEC. The variator 4 is included in the belt continuously variable transmission in which the groove widths of the PRI pulley 41 and the SEC pulley 42 are respectively changed so as to change the winding diameter of the belt 43, resulting in changing speed.

The PRI pulley 41 includes a fixed pulley 41a and a movable pulley 41b. A controller 10 controls the volume of oil to be supplied to a PRI pulley hydraulic chamber 41c, whereby the movable pulley 41b operates to change the groove width of the PRI pulley 41.

The SEC pulley 42 includes a fixed pulley 42a and a movable pulley 42b. The controller 10 controls the volume of oil to be supplied to a SEC pulley hydraulic chamber 42c, whereby the movable pulley 42b operates to change the groove width of the SEC pulley 42.

The belt 43 is wound around the V-shaped sheave surface formed by the fixed pulley 41a and the movable pulley 41b of the PRI pulley 41, and the V-shaped sheave surface formed by the fixed pulley 42a and the movable pulley 42b of the SEC pulley 42.

The final reduction mechanism 5 transmits the output rotation from the variator 4 to the drive wheel 6. The final reduction mechanism 5 is configured with a plurality of gear trains and a differential gear. The final reduction mechanism 5 rotates the drive wheel 6 via an axle.

The hydraulic circuit 100 supplies hydraulic pressure to the variator 4, more specifically, the PRI pulley 41 and the SEC pulley 42. The hydraulic circuit 100 also supplies hydraulic pressure to the forward/reverse switching mechanism 3 and the lock-up clutch 2a, further to a lubrication system and a cooling system not shown. Specifically, the hydraulic circuit 100 is configured as follows.

Figure 2:
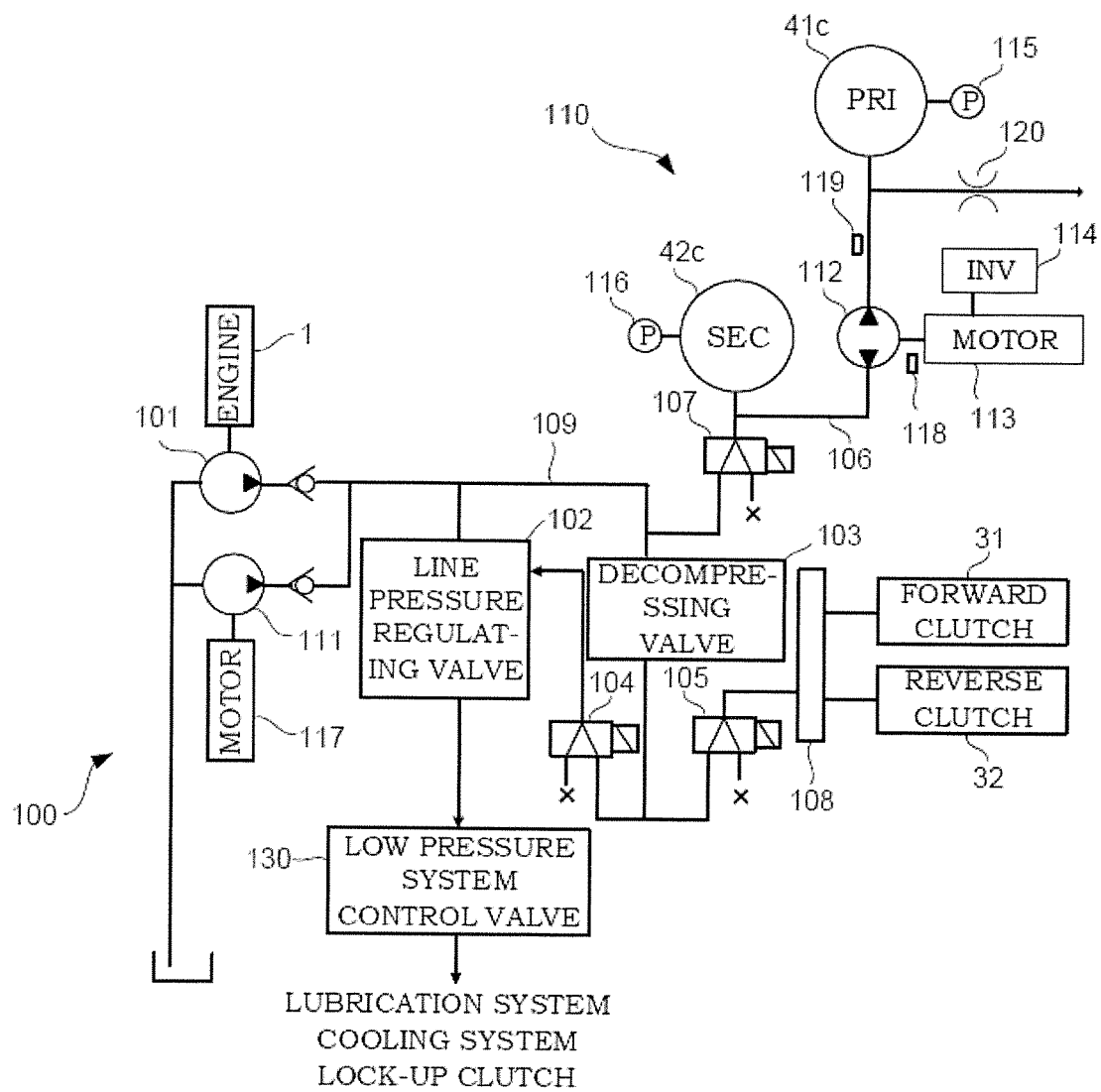
FIG. 2 is a schematic configuration diagram of a hydraulic circuit.

FIG. 2 is the schematic configuration diagram of the hydraulic circuit 100. The hydraulic circuit 100 includes an oil pump 101 for source pressure, a line pressure regulating valve 102, a decompressing valve 103, a line pressure solenoid valve 104, a forward/reverse switching mechanism solenoid valve 105, a speed change circuit pressure solenoid valve 107, a manual valve 108, an oil passage 109 for line pressure (first oil passage), a low pressure system control valve 130, a speed change circuit 110, and an electric oil pump 111 for line pressure. Hereinafter, the terminology of solenoid valve is abbreviated as SOL.

The oil pump 101 for source pressure is a mechanical oil pump to be driven by the driving force of the engine 1. The oil pump 101 for source pressure is connected to the line pressure regulating valve 102, the decompressing valve 103, and the speed change circuit pressure SOL 107 and the speed change circuit 110, via the oil passage 109 for line pressure. The oil passage 109 for line pressure is included in an oil passage for a line pressure. The line pressure is the hydraulic pressure corresponding to the source pressure of the PRI pressure and the SEC pressure.

The electric oil pump 111 for line pressure is driven by an electric motor 117. The electric oil pump 111 for line pressure operates to supply line pressure, for example, in the case where the engine 1 stops under the control for stopping an idling state, and accordingly the oil pump 101 for source pressure stops.

The line pressure regulating valve 102 regulates the hydraulic pressure generated by the oil pump 101 for source pressure, so as to generate the line pressure. The generation of the line pressure by the oil pump 101 for source pressure includes the generation of the line pressure under such regulation by the line pressure regulating valve 102. The oil relieved when the line pressure regulating valve 102 regulates the pressure is supplied to the lock-up clutch 2a, the lubrication system, and the cooling system via the low pressure system control valve 130.

The decompressing valve 103 reduces the line pressure. The hydraulic pressure reduced by the decompressing valve 103 is supplied to the line pressure SOL 104 and the forward/reverse switching mechanism SOL 105.

The line pressure SOL 104, which is a linear solenoid valve, generates the control hydraulic pressure according to control current. The control hydraulic pressure generated by the line pressure SOL 104 is supplied to the line pressure regulating valve 102, and the line pressure regulating valve 102 operates according to the control hydraulic pressure generated by the line pressure SOL 104, thereby regulating pressure. Therefore, a command value of a line pressure PL is enabled to be set by use of the control current to the line pressure SOL 104.

The forward/reverse switching mechanism SOL 105, which is a linear solenoid valve, generates the hydraulic pressure according to the control current. The hydraulic pressure generated by the forward/reverse switching mechanism SOL 105 is supplied to the forward clutch 31 and the reverse brake 32 via the manual valve 108 for operating according to driver's operation.

The speed change circuit pressure SOL 107, which is a linear solenoid valve, generates the hydraulic pressure supplied to the speed change circuit 110 according to the control current. Therefore, a command value of a speed change circuit pressure is enabled to be set by use of the control current to the speed change circuit pressure SOL 107. The speed change circuit pressure generated by the speed change circuit pressure SOL 107 is supplied to the oil passage 106 for speed change (second oil passage). The speed change circuit pressure may be generated by, for example, the SOL for generating the control hydraulic pressure according to the control current, and the pressure regulating valve for generating the control circuit pressure from the line pressure PL according to the control hydraulic pressure generated by the SOL.

The speed change circuit 110 includes the oil passage 106 for speed change connected to the oil passage 109 for line pressure via the speed change circuit pressure SOL 107, and an oil pump 112 for speed change interposed on the oil passage 106 for speed change. The oil passage 106 for speed change communicates between the PRI pulley hydraulic chamber 41c and the SEC pulley hydraulic chamber 42c.

The oil pump 112 for speed change is an electric oil pump to be driven by an electric motor 113. The electric motor 113 is controlled by the controller 10 via an inverter 114. The oil pump 112 for speed change is capable of switching the rotation direction between a normal direction and a reverse direction. The normal direction herein corresponds to the direction in which oil is fed from the SEC pulley hydraulic chamber 42c to the PRI pulley hydraulic chamber 41c, while the reverse direction corresponds to the direction in which oil is fed from the PRI pulley hydraulic chamber 41c to the SEC pulley hydraulic chamber 42c.

When the oil pump 112 for speed change rotates in the normal direction, the oil in the oil passage 106 for speed change is supplied to the PRI pulley hydraulic chamber 41c. As a result, the movable pulley 41b of the PRI pulley 41 moves in the direction approaching the fixed pulley 41a, whereby the groove width of the PRI pulley 41 decreases. On the other hand, the movable pulley 42b of the SEC pulley 42 moves in the direction away from the fixed pulley 42a, whereby the groove width of the SEC pulley 42 increases. It is noted that when the oil pump 112 for speed change rotates in the normal direction, oil is supplied from the oil passage 109 for line pressure to the oil passage 106 for speed change, so that the hydraulic pressure in the oil passage 106 for speed change in the side of the SEC pulley hydraulic chamber 42c (hereinafter, also referred to as "SEC-side hydraulic pressure") up to the oil pump 112 for speed change (hereinafter, also referred to as "SEC side") does not fall below the command value of the speed change circuit pressure. The command value of the speed change circuit pressure is set in consideration such as to prevent slippage of the belt 43. It is noted that the hydraulic pressure in the oil passage 106 for speed change in the side of the PRI pulley hydraulic chamber 41c (hereinafter, also referred to as "PRI side") up to the oil pump 112 for speed change is also referred to as a PRI-side hydraulic pressure.

When the oil pump 112 for speed change rotates in the reverse direction, oil flows out from the PRI pulley hydraulic chamber 41c. As a result, the movable pulley 41b of the PRI pulley 41 moves in the direction away from the fixed pulley 41a, whereby the groove width of the PRI pulley 41 increases. On the other hand, the movable pulley 42b of the SEC pulley 42 moves in the direction approaching the fixed pulley 42a, whereby the groove width of the SEC pulley 42 decreases. The oil having flowed out from the PRI pulley hydraulic chamber 41c then flows in, whereby the SEC-side hydraulic pressure increases. The speed change circuit pressure SOL 107 performs control so that the SEC-side hydraulic pressure does not exceed the command value. That is, in the case where the SEC-side hydraulic pressure is greater than the command value, oil is discharged from the oil passage 106 for speed change via the speed change circuit pressure SOL 107. On the other hand, in the case where the SEC-side hydraulic pressure is lower than the command value, oil flows in from the oil passage 109 for line pressure via the speed change circuit pressure SOL 107.

As described above, in the continuously variable transmission of the first embodiment, the oil pump 112 for speed change controls the flowing-in and flowing-out of oil with respect to the PRI pulley hydraulic chamber 41c, thereby changing speed. The outline of speed change control will be described below.

The oil passage 106 for speed change has a branch passage branching from between the oil pump 112 for speed change and the PRI pulley hydraulic chamber 41c. The branch passage has an orifice 120, and the orifice 120 allows oil to flow out to the outside of the oil passage 106 for speed change. Specifically, the orifice 120 is formed such that the oil passage partially has a smaller diameter, and the end on the opposite side of the branch point in the oil passage 106 for speed change is opened. Oil is continuously leaking from the open end. In the case where the oil pump 112 for speed change supplies oil to the PRI pulley hydraulic chamber 41c, some oil leaks from the orifice 120. The oil to be discharged from the orifice to the outside of the oil passage 106 for speed change is discharged into the space inside the case of the continuously variable transmission. As described above, in the first embodiment, the outside of the oil passage 106 for speed change (the outside of the orifice 120) corresponds to space. Alternatively, the outside of the oil passage 106 for speed change (the outside of the orifice 120) may correspond to an oil passage having a lower hydraulic pressure compared with the oil passage 106 for speed change. In other words, the outside of the oil passage 106 for speed change may correspond to a portion having a lower hydraulic pressure compared with the oil passage 106 for speed change. It is noted that the orifice 120 is an example of an oil discharge mechanism.

Returning to FIG. 1, the vehicle further includes the controller 10. The controller 10, which is an electronic control device, receives a signal from a sensor/switch group 11. It is noted that the controller 10 is configured with a microcomputer including a central processing unit (CPU), a read only memory (ROM), a random access memory (RAM), and an input/output interface (I/O interface). The controller 10 may be configured with a plurality of microcomputers.

The sensor/switch group 11 includes, for example, an accelerator opening sensor for detecting an accelerator opening degree of the vehicle, a brake sensor for detecting a brake stepping force of the vehicle, a vehicle speed sensor for detecting a vehicle speed Vsp, and an engine rotation speed sensor for detecting a rotation speed NE of the engine 1.

The sensor/switch group 11 further includes a PRI pressure sensor 115 for detecting the PRI pressure, a SEC pressure sensor 116 for detecting the SEC pressure, a pump rotation speed sensor 118 for detecting the rotation speed of the oil pump 112 for speed change, and an oil temperature sensor 119 for detecting the temperature of the oil in the oil passage 106 for speed change. A signal from the sensor/switch group 11 may, for example, be input to the controller 10 via another controller. The same applies to a signal such as of the information generated by another controller based on a signal from the sensor/switch group 11.

The controller 10 controls the hydraulic circuit 100 based on a signal from the sensor/switch group 11. Specifically, the controller 10 controls the line pressure SOL 104 and the speed change circuit 110 shown in FIG. 2. The controller 10 is configured to further control the forward/reverse switching mechanism SOL 105 and the speed change circuit pressure SOL 107.

In controlling the line pressure SOL 104, the controller 10 supplies the control current according to the command value of the line pressure PL to the line pressure SOL 104.

In controlling speed change, the controller 10 sets a target speed ratio based on a signal from the sensor/switch group 11. When a target speed ratio is determined, a winding diameter (a target winding diameter) relevant to the pulleys 41, 42 for realizing the target speed ratio is determined. When a target winding diameter is determined, a groove width (a target groove width) of each of the pulleys 41, 42 for realizing the target winding diameter is determined.

In the speed change circuit 110', the movable pulley 41b of the PRI pulley 41 moves according to the flowing-in and flowing-out of oil with respect to the PRI pulley hydraulic chamber 41c by the oil pump for speed change, and the movable pulley 42b of the SEC pulley 42 also moves accordingly. That is, the amount of movement of the movable pulley 41b of the PRI pulley 41 correlates with the amount of movement of the movable pulley 42b of the SEC pulley 42.

The controller 10 makes the oil pump 112 for speed change operate so that the position of the movable pulley 41b of the PRI pulley 41 corresponds to the position corresponding to the target speed ratio. Whether the movable pulley 41b is positioned at a desired position is determined in a such a manner that an actual speed ratio is calculated from the values detected by a PRI rotation speed sensor 41d and a SEC rotation speed sensor 42d, and thereafter whether the actual speed ratio coincides with the target speed ratio.

The controller 10 makes the oil pump 112 for speed change operate not only at the time of speed change. Even in the case where the target speed ratio does not change, when oil leaks from each of the pulley hydraulic chambers 41c, 42c and the actual speed ratio thus changes, the controller 10 makes the oil pump 112 for speed change operate. It is noted that, in the first embodiment, such control for maintaining a target speed ratio is also included in the speed change control.

That is, the speed change control in the first embodiment corresponds to the feedback control for making the position of the movable pulley 41*b* of the PRI pulley 41 converge to a target position. The control object of the feedback control is the groove width of the PRI pulley 41, in other words, the position of the movable pulley 41*b*, not a hydraulic pressure of each of the pulley hydraulic chambers 41*c*, 42*c*.

It is noted that a sensor for detecting the position of the movable pulley 41*b* may be provided so that whether the movable pulley 41*b* is at the position corresponding to the target speed ratio is determined.

In the PRI pulley 41 and the SEC pulley 42, the flowing-in volume of oil is controlled so that the piston moves inside the cylinder, thereby enabling to realize the target speed ratio. However, since a gap exists between the piston and the cylinder, oil leaks through the gap during such movement or the like. For example, if oil leaks in the PRI pulley 41, there is a risk of deterioration in control accuracy of the speed ratio. Therefore, the electric motor 113 is made to operate at a rotation speed higher than a predetermined rotation speed, thereby making the oil pump 112 for speed change discharge oil. The PRI pulley 41 is compensated for the flow volume of leakage of oil by such operation, thereby enabling to suppress the deterioration in control accuracy of the speed ratio.

The electric motor 113 is characteristically not enabled to be controlled properly in the case where the command value of a rotation speed is extremely small. That is, the electric motor 113 has a controllable lower limit rotation speed Nmin. Accordingly, the oil pump 112 for speed change has a lower limit of a dischargeable oil flow volume F. In the description below, the lower limit of the oil flow volume enabled to be discharged by the oil pump 112 for speed change is referred to as Fmin.

Figure 3:
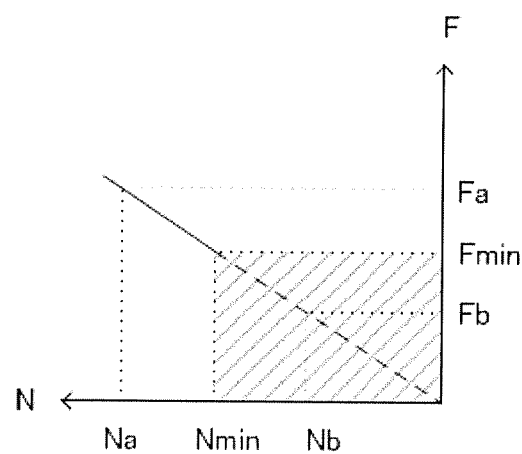
FIG. 3 is a graph indicating the relation between a rotation speed of an oil pump and an oil flow volume.

FIG. 3 is a graph indicating the relation between a rotation speed N of the electric motor 113 and an oil flow volume F of leakage in the PRI pulley 41. In the graph, a rotation speed N of the electric motor 113 is indicated in the horizontal axis (in the leftward direction in the graph), and an oil flow volume F of leakage in the PRI pulley 41 is indicated in the vertical axis (in the upward direction in the graph). The hatched area indicates the area in which the electric motor 113 is not enabled to be controlled properly.

The electric motor 113 is not enabled to be properly controlled at a rotation speed N lower than the lower limit rotation speed Nmin. Therefore, the oil pump 112 for speed change is not capable of discharging oil of a flow volume less than the lower limit flow volume Fmin.

In an example, the following case is examined: the oil flow volume F of leakage in the PRI pulley 41 is Fa which is greater than the lower limit flow volume Fmin (Fa>Fmin). In this case, the electric motor 113 is controlled at a rotation speed Na, whereby the oil pump 112 for speed change discharges oil of the oil flow volume Fa. In such a case, the PRI pulley 41 is compensated for the flow volume of leakage of oil.

Another case is examined: the oil flow volume F of leakage in the PRI pulley 41 is Fb which is less than the lower limit flow volume Fmin (Fb<Fmin). In this case, the electric motor 113 is not enabled to be controlled at a rotation speed Nb, whereby the oil pump 112 for speed change is not capable of discharging oil of the oil flow volume Fb. If the electric motor 113 is controlled at the lower limit rotation speed Nmin, the oil pump 112 for speed change discharges oil of the flow volume Fmin which is greater than the desired flow volume Fb.

In the first embodiment, the oil passage 106 for speed change has the orifice 120 which is capable of discharging oil to the outside of the oil passage 106 for speed change. Therefore, even though the electric motor 113 operates so that oil of the flow volume Fmin is discharged, some oil is discharged from the orifice 120 to the outside of the oil passage 106 for speed change. Therefore, the PRI pulley 41 is compensated for the flow volume Fb of leakage of oil, thereby enabling to suppress the deterioration in control accuracy of the speed ratio.

The first embodiment may have one or more of the following effects.

According to the first embodiment, the oil passage 106 for speed change includes a discharge mechanism (orifice 120) which is capable of discharging oil. The electric motor 113 is not enabled to be controlled at a rotation speed lower than the lower limit rotation speed Nmin. It is noted that, in the case where the electric motor 113 is controlled at the lower limit rotation speed Nmin, the oil flow volume F discharged by the oil pump 112 for speed change is the lower limit flow volume Fmin. That is, the oil pump 112 for speed change is not capable of discharging oil of a flow volume less than the lower limit flow volume Fmin.

Even in the case where the electric motor 113 is controlled at the lower limit rotation speed Nmin, and accordingly the oil pump 112 for speed change discharges oil of the lower limit flow volume Fmin, some oil is discharged from the orifice 120. The PRI pulley 41 is thus supplied the flow volume of leakage of oil, thereby enabling to suppress the deterioration in control accuracy of the speed ratio.

According to the first embodiment, the orifice 120 serves as an oil discharge mechanism. The orifice 120 is enabled to be configured in such a manner that the oil passage partially has a smaller diameter. Therefore, compared with the case of providing a valve or the like, such a simpler configuration enables to improve control accuracy of the speed ratio.

Second Embodiment

In the description above of the first embodiment, the orifice 120 serves as an oil discharge mechanism. In the description below of the second embodiment, an openable and closable valve serves as an oil discharge mechanism.

Figure 4:
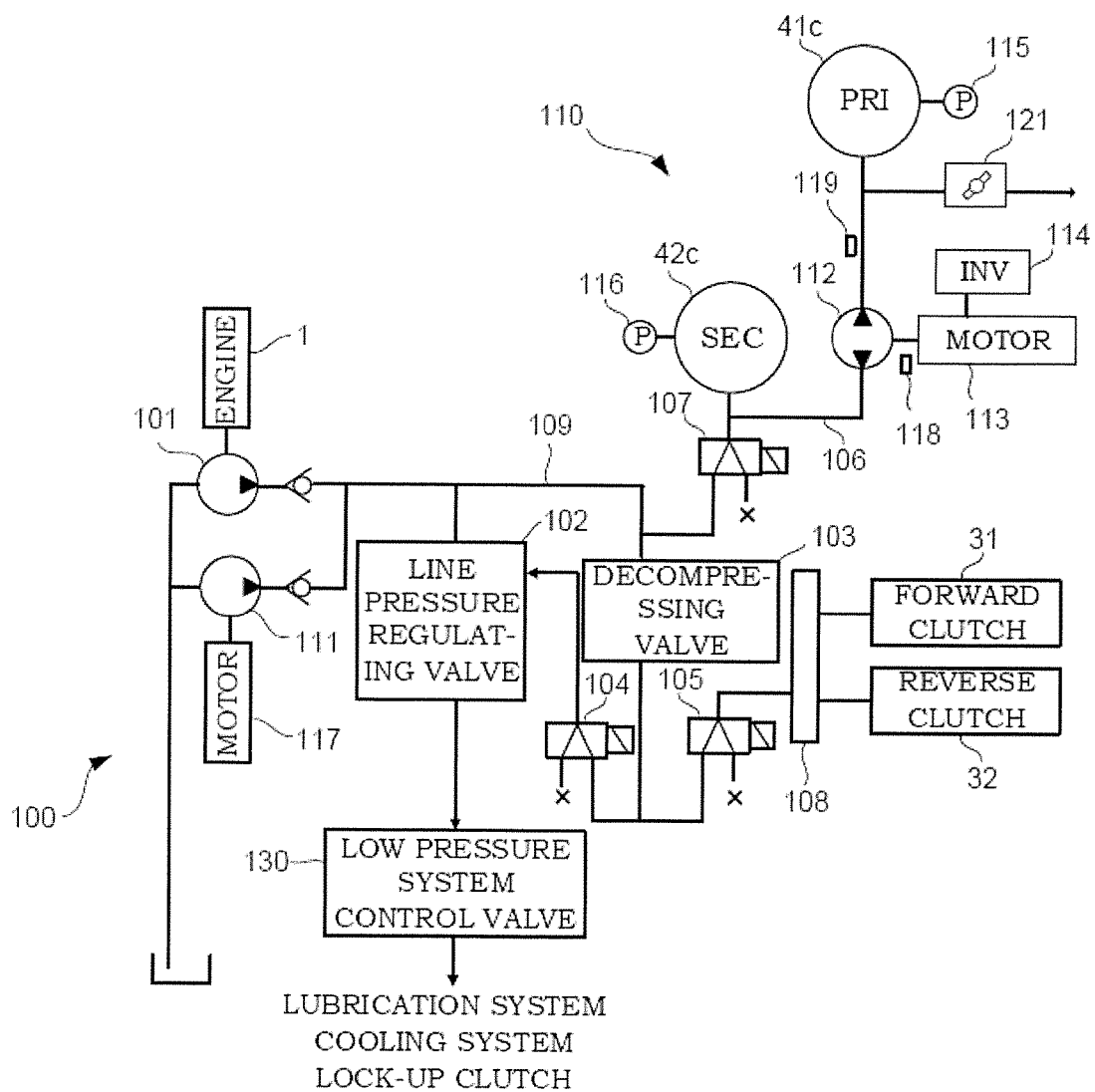
FIG. 4 is a schematic configuration diagram of a hydraulic circuit.

FIG. 4 is a schematic configuration diagram of the hydraulic circuit 100 of the second embodiment. According to the diagram, an openable and closable valve 121 is provided in place of the orifice 120, unlike the hydraulic circuit 100 of the first embodiment shown in FIG. 2. The valve 121 is controlled to open and close by the controller 10.

For the sake of explanation of the concept of the control of the valve 121, a description is provided below about the control of the valve 121 by use of the oil flow volume F of leakage in the PRI pulley 41.

Figure 5:
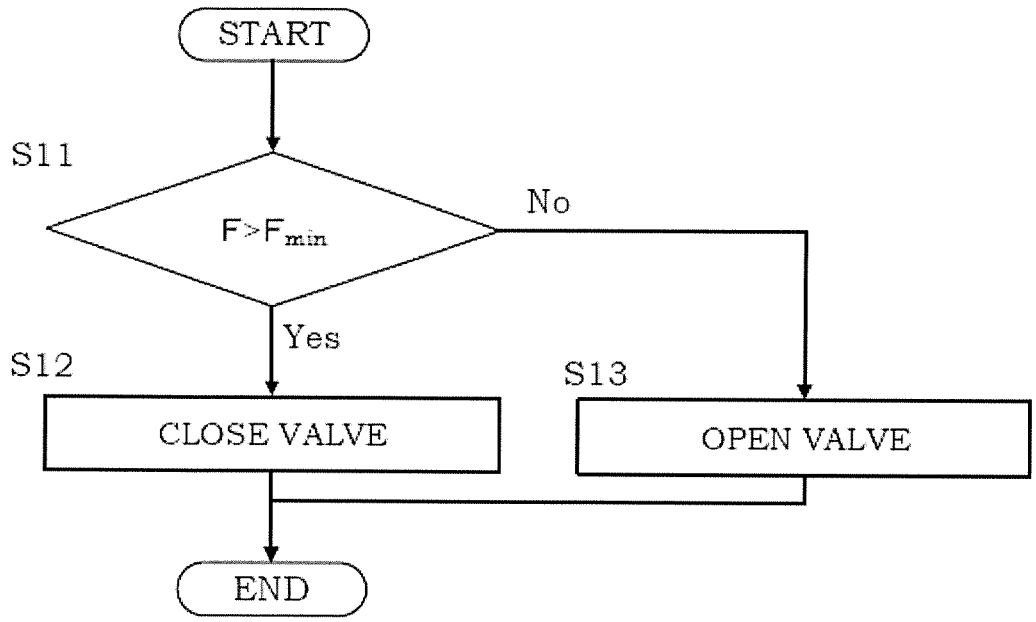
FIG. 5 is a flowchart for controlling a valve according to the oil flow volume.

FIG. 5 is a flowchart for controlling the valve 121 by use of the oil flow volume F. The control is repeated at intervals of, for example, approx. several milliseconds.

In step S11, the controller 10 determines whether the oil flow volume F of leakage in the PRI pulley 41 is greater than the lower limit flow volume Fmin. In the case where the oil flow volume F is greater than the lower limit flow volume Fmin (S11: Yes), the process proceeds to step S12. In the case where the oil flow volume F is equal to or less than the lower limit flow volume Fmin (S11: No), the process proceeds to step S13.

In step S12, the controller 10 closes the valve 121.

In step S13, the controller 10 opens the valve 121.

The following example case (S11: Yes) is examined: the oil flow volume F of leakage in the PRI pulley 41 is greater than the lower limit flow volume Fmin. In this case, the electric motor 113 is driven at a rotation speed greater than the lower limit rotation speed Nmin, whereby the oil pump 112 for speed change enables to discharge oil of the flow volume F. Therefore, even if the valve 121 is closed (S12), the PRI pulley 41 is compensated for the flow volume of leakage of oil, thereby enabling to suppress the deterioration in control accuracy of the speed ratio. The valve 121 is closed (S12), whereby oil is not wastefully discharged from the valve 121.

Another following case (S11: No) is examined: the oil flow volume F of leakage in the PRI pulley 41 is less than the lower limit flow volume Fmin. The electric motor 113 is not enabled to be driven at a rotation speed lower than the lower limit rotation speed Nmin. If the electric motor 113 is driven at the lower limit rotation speed Nmin, the oil pump 112 for speed change discharges oil of a flow volume greater than the oil flow volume F of leakage in the PRI pulley 41. However, when the valve 121 is opened (S13), some oil is discharged to the outside of the oil passage 106 for speed change. Therefore, the PRI pulley 41 is compensated for the flow volume of leakage of oil, thereby enabling to suppress the deterioration in control accuracy of the speed ratio.

The oil flow volume F of leakage in the PRI pulley 41 changes in accordance with an oil temperature T in the oil passage 106 for speed change and a PRI pressure P in the PRI pulley 41. Therefore, the valve 121 is enabled to be controlled to open and close by use of these parameters. The oil flow volume F of leakage in the PRI pulley 41 is enabled to be estimated by use of the measured value of the rotation speed N of the electric motor 113. Therefore, the valve 121 is enabled to be controlled also by use of the rotation speed N of the electric motor 113. The description below is about the example in which the valve 121 is controlled to open and close by use of these parameters.

It is noted that the PRI pressure P is detected by the PRI pressure sensor 115. The oil temperature T in the oil passage 106 for speed change is measured by the oil temperature sensor 119. The rotation speed N of the oil pump 112 for speed change is measured by the pump rotation speed sensor 118.

First, the description below is about the example in which the valve 121 is controlled according to the oil temperature T of the oil passage 106 for speed change.

Figure 6:
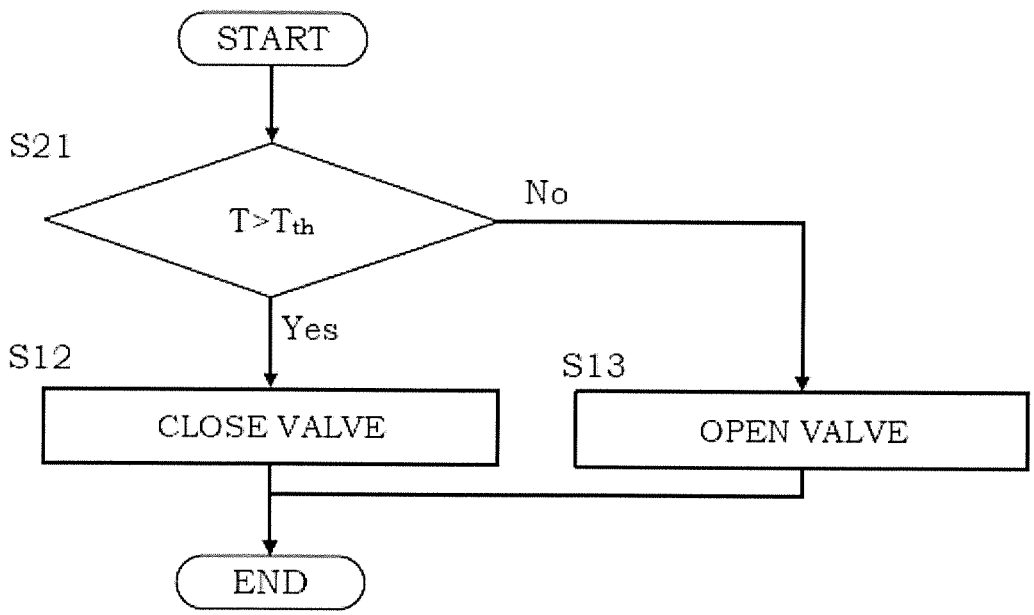
FIG. 6 is a flowchart for controlling the valve according to an oil temperature.

FIG. 6 is the flowchart for controlling the valve 121 by use of the oil temperature T. The control is repeated at intervals of, for example, approx. several milliseconds. The flowchart, unlike the flowchart shown in FIG. 5, has no processing of step S11, but has the processing of step S21 instead.

In step S21, the controller 10 determines whether the oil temperature T is higher than a threshold temperature Tth. In the case where the oil temperature T is higher than the threshold temperature Tth (S21: Yes), the process proceeds to step S12. In the case where the oil temperature T is equal to or lower than the threshold temperature Tth (S21: No), the process proceeds to step S13.

It is noted that since oil viscosity increases as an oil temperature T lowers, the oil flow volume of leakage in the PRI pulley 41 decreases. If the electric motor 113 is controlled at the lower limit rotation speed Nmin, the oil pump 112 for speed change discharges oil of a volume greater than the flow volume of leakage in the PRI pulley 41. Therefore, the valve 121 is opened so that some oil is discharged from the valve 121, resulting in that oil of the flow volume of leakage is supplied to the PRI pulley 41. This enables to suppress the deterioration in control accuracy of the speed ratio.

For example, the threshold temperature Tth may be calculated based on the relation between the oil temperature T and the oil flow volume of leakage in the PRI pulley 41, measured in advance in an experiment or the like. The threshold temperature Tth may be set to a low temperature (for example, 10° C.) at which oil has relatively high viscosity. The description below is about one example of specifically calculating the threshold temperature Tth.

Figure 7:
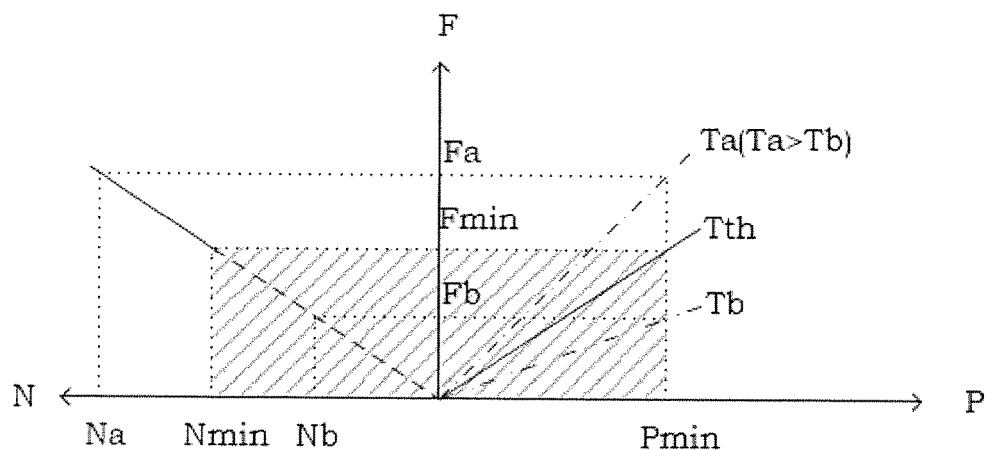
FIG. 7 is a diagram to explain the control of the valve according to the oil temperature.

FIG. 7 is a graph indicating the relation among a rotation speed N, an oil flow volume F, and a PRI pressure P. The left side of the graph indicates the relation between a rotation speed N and an oil flow volume F as shown in FIG. 3. The right side of the graph indicates the relation between a PRI pressure P and an oil flow volume F.

In the graph, a lower limit pressure Pmin corresponds to the lowest PRI pressure P in the pressure range of the PRI pressure P determined according to the speed ratio. The lower the PRI pressure P is, the lower the oil flow volume F of leakage in the PRI pulley 41 is. Therefore, under the condition where the speed ratio is fixed, in the case where the PRI pressure P is the lower limit pressure Pmin, the oil flow volume F of leakage in the PRI pulley 41 is the minimum. The threshold temperature Tth, which is the condition for controlling the valve 121 to open and close, is calculated on the premise that the PRI pressure P is the lower limit pressure Pmin, and based on the oil flow volume F of leakage in the PRI pulley 41.

Since oil viscosity decreases as an oil temperature T rises, the oil flow volume F of leakage in the PRI pulley 41 increases. Therefore, the threshold temperature Tth is set to the oil temperature T of the case where the PRI pressure P is the lower limit pressure Pmin and where the oil flow volume of leakage in the PRI pulley 41 is Fmin. The valve 121 is controlled to open and close by use of the threshold temperature Tth.

For example, in the case where the PRI pressure P is the lower limit pressure Pmin, when the oil temperature T is Ta which is higher than the threshold temperature Tth (S21: Yes), the oil flow volume F of leakage in the PRI pulley 41 is Fa which is greater than the lower limit flow volume Fmin (Fa>Fmin). In such a case, when the electric motor 113 is controlled at the rotation speed Na, the oil pump 112 for speed change discharges oil of the flow volume Fa. Therefore, oil of the flow volume Fa of leakage is supplied to the PRI pulley 41, thereby enabling to suppress the deterioration in control accuracy of the speed ratio. The valve 121 is closed (S12), thereby enabling to suppress unnecessary discharging of oil.

On the other hand, when the oil temperature T is Tb which is lower than the threshold temperature Tth (S21: No), the oil flow volume F of leakage in the PRI pulley 41 is Fb which is less than the lower limit flow volume Fmin (Fb<Fmin). At this time, since the electric motor 113 is not enabled to be controlled at the rotation speed Nb, the oil pump 112 for speed change is not capable of discharging oil of the flow volume Fb. However, since the valve 121 is opened (S13), some oil is discharged from the valve 121. Therefore, even though the electric motor 113 is controlled at the lower limit rotation speed Nmin so that the oil pump 112 for speed change discharges oil of the flow volume Fmin, the PRI pulley 41 is compensated for the flow volume Fb of leakage of oil. This enables to suppress the deterioration in control performance of the speed ratio.

The next description is about the example of controlling the valve 121 according to the PRI pressure P.

Figure 8:
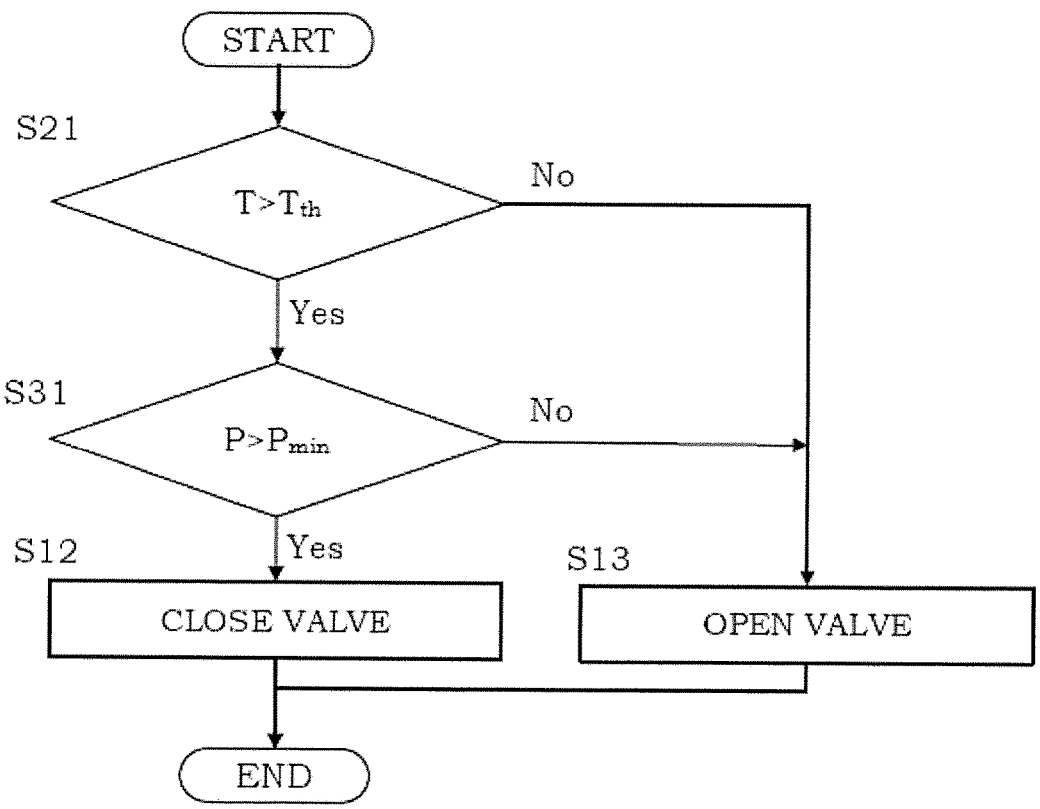
FIG. 8 is a flowchart for controlling the valve according to the oil temperature and a PRI pressure.

FIG. 8 is a flowchart indicating the control of the valve 121 according to the oil temperature T and the PRI pressure P. The control is repeated at intervals of, for example, approx. several milliseconds. The flowchart, unlike the flowchart shown in FIG. 6, has the additional processing of step S31 after the processing of step S21.

In step S31, determination is made of whether the PRI pressure P is greater than the lower limit pressure Pmin. In the case where the PRI pressure P is greater than the lower limit pressure Pmin (S31: Yes), the process proceeds to S12. In the case where the PRI pressure P is equal to or less than the lower limit pressure Pmin (S31: No), the process proceeds to S13. The description below is about the use of the lower limit pressure Pmin as the condition for controlling the valve 121 to open and close.

According to the flowchart, in the case where the oil temperature T is higher than the threshold temperature Tth (S21: Yes), the valve 121 is controlled to open and close according to the PRI pressure P. The higher the oil temperature T is in comparison with the threshold temperature Tth, the more the oil flow volume of leakage in the PRI pulley 41 increases, and thus the valve 121 is less required to be closed. The description below is about the example in which the condition for controlling the valve 121 to open and close is determined on the premise that the oil flow volume of leakage in the PRI pulley 41 is the minimum while the oil temperature T is same or higher than the threshold temperature Tth, that is, on the premise that the oil temperature T is the threshold temperature Tth.

Figure 9:
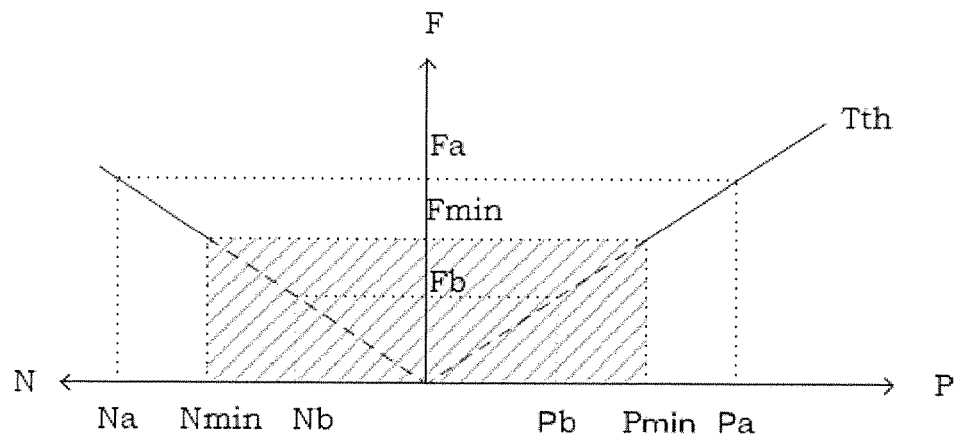
FIG. 9 is a diagram to explain the control of the valve according to the PRI pressure.

FIG. 9 shows the relation among a rotation speed N of the electric motor 113, an oil flow volume F, and a PRI pressure P. The left side of the graph indicates the relation between a rotation speed N and an oil flow volume F. The right side of the graph indicates the relation between a PRI pressure P and an oil flow volume F, of the case where the oil temperature T is the threshold temperature Tth.

According to the graph, in the case where the PRI pressure P is lower than the lower limit pressure Pmin, oil of a flow volume less than the lower limit flow volume Fmin leaks in the PRI pulley 41. However, the electric motor 113 is not enabled to be controlled at a rotation speed lower than the lower limit rotation speed Nmin. If the electric motor 113 is controlled at the lower limit rotation speed Nmin, the oil pump 112 for speed change discharges oil of the lower limit flow volume Fmin. Therefore, the valve 121 needs to be opened. For this reason, in the case where the PRI pressure P is equal to or less than the lower limit pressure Pmin (S31: No), the valve 121 is opened (S13).

In the example case where the PRI pressure P is Pa which is higher than the lower limit pressure Pmin (Pa>Pmin) (S31: Yes), the oil flow volume of leakage in the PRI pulley 41 is Fa which is greater than the lower limit flow volume Fmin (Fa>Fmin). When the electric motor 113 is controlled at the rotation speed Na, the oil pump 112 for speed change discharges oil of the flow volume Fa. Therefore, the PRI pulley 41 is compensated for the flow volume Fa of leakage of oil, thereby enabling to suppress the deterioration in control accuracy of the speed ratio. The valve 121 is closed (S12), thereby enabling to suppress unnecessary discharging of oil.

In the case where the PRI pressure P is Pb which is lower than the lower limit pressure Pmin (Pb<Pmin) (S31: No), the oil flow volume of leakage in the PRI pulley 41 is Fb which is lower than the lower limit flow volume Fmin (Fb<Fmin). However, the electric motor 113 is not enabled to be controlled at the rotation speed Nb, whereby the oil pump 112 for speed change is not capable of discharging oil of the flow volume Fb. If the electric motor 113 is driven at the lower limit rotation speed Nmin, the oil pump 112 for speed change discharges oil of the flow volume Fmin which is greater than the flow volume Fb of leakage in the PRI pulley 41. However, since the valve 121 is opened (S13), some oil is discharged to the outside of the oil passage 106 for speed change. Therefore, the PRI pulley 41 is compensated for the flow volume Fb of leakage of oil, thereby enabling to suppress the deterioration in control accuracy of the speed ratio.

Figure 10:
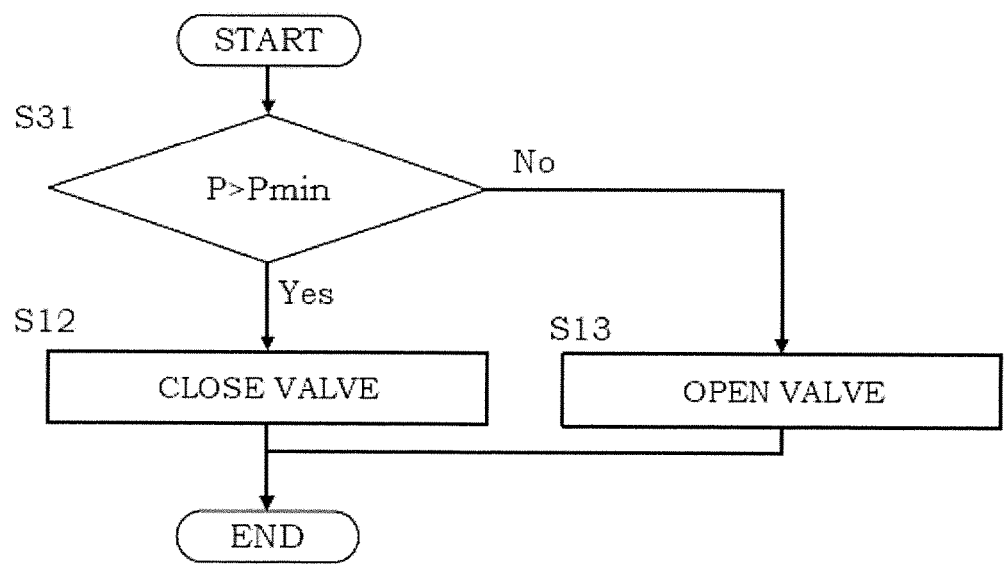
FIG. 10 is a flowchart for controlling the valve according to the PRI pressure.

It is noted that, in the flowchart shown in FIG. 8, the control based on the oil temperature T (S21) and the control based on the PRI pressure P (S31) are simultaneously performed, but the present invention is not limited thereto. As shown in FIG. 10, only the control based on the PRI pressure P (S31) may be performed.

The next description is about the example in which the valve 121 is controlled according to the rotation speed N of the electric motor 113. Since the oil pump 112 for speed change and the electric motor 113 are connected to each other, the rotation speed N of the oil pump 112 for speed change measured by the pump rotation speed sensor 118 is equal to the rotation speed N of the electric motor 113. In this case, when oil leaks in the PRI pulley 41, the position of the piston changes, and accordingly the controller 10 drives the electric motor 113 so that the position of the piston does not change. That is, the controller 10 controls the electric motor 113 so that the oil pump 112 for speed change discharges oil of the oil flow volume of leakage in the PRI pulley 41.

The electric motor 113 has the lower limit value Nmin of the controllable rotation speed. In the case where the electric motor 113 is controlled with a command value of a rotation speed lower than the lower limit rotation speed Nmin, the electric motor 113 rotates at a rotation speed which is an erroneous speed but close to the command value, that is, at a rotation speed lower than the lower limit rotation speed Nmin. However, the electric motor 113 is not controlled properly, and thus may rotate at a rotation speed higher than the desired rotation speed. In such a case, there is a risk that the oil pump 112 for speed change discharges oil of a flow volume greater than the flow volume of leakage in the PRI pulley 41. Moreover, if the electric motor 113 rotates at a rotation speed lower than the desired rotation speed, the oil pump 112 for speed change may discharge oil only of a flow volume less than the flow volume of leakage in the PRI pulley 41. Accordingly, as will be described below, the valve 121 is controlled to open and close, and the electric motor 113 is further controlled to rotate, based on the magnitude relation between the rotation speed N and the lower limit rotation speed Nmin of the electric motor 113.

Figure 11:
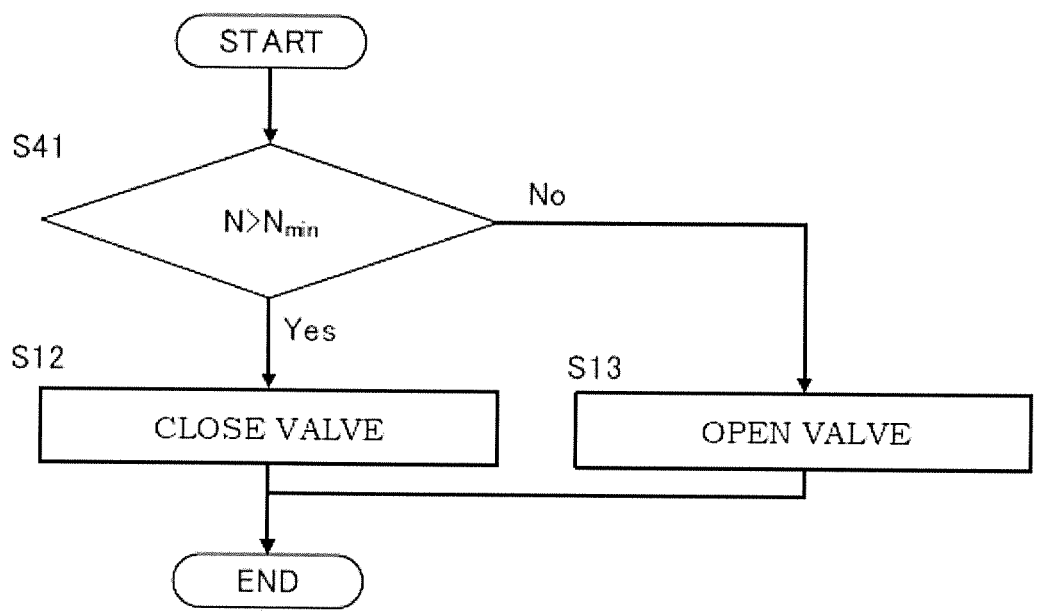
FIG. 11 is a flowchart for controlling the valve according to a rotation speed.

FIG. 11 is a flowchart of the control of the control valve 121 according to the rotation speed N of the electric motor 113, of the case where the speed ratio is constant. The control is repeated at intervals of, for example, approx. several milliseconds. The flowchart, unlike the flowchart shown in FIG. 5, has no processing of S11, but has the processing of S41.

In step S41, the controller 10 determines whether the rotation speed N of the electric motor 113 is greater than the lower limit rotation speed Nmin. In the case where the rotation speed N is greater than the lower limit rotation speed Nmin (S41: Yes), the process proceeds to step S12. In the case where the rotation speed N is equal to or less than the lower limit rotation speed Nmin (S41: No), the process proceeds to step S13.

In the case where the rotation speed N is greater than the lower limit rotation speed Nmin (S41: Yes), the valve 121 is closed (S12). In such a case, the electric motor 113 rotates at the rotation speed N, whereby the oil pump 112 for speed change discharges oil of the flow volume of leakage in the PRI pulley 41. Therefore, the PRI pulley 41 is compensated for the flow volume of leakage of oil, thereby enabling to suppress the deterioration in control performance of the speed ratio.

While in the case where the rotation speed N is equal to or less than the lower limit rotation speed Nmin (S41: No), the valve 121 is opened (S13). Then, the controller 10 controls the electric motor 113 at the lower limit rotation speed Nmin, not with the command value of the rotation speed based on the position of the piston in the PRI pulley 41. If the electric motor 113 is controlled at the lower limit rotation speed Nmin, the oil pump 112 for speed change discharges oil of a flow volume greater than the flow volume of leakage in the PRI pulley 41. However, since the valve 121 is opened (S13), some oil is discharged from the valve 121 to the outside of the oil passage 106 for speed change. Therefore, the PRI pulley 41 is compensated for the flow volume of leakage of oil, thereby enabling to suppress the deterioration in control accuracy of the speed ratio.

It is noted that, in the example described above, the valve 121 is controlled according to the rotation speed N of the electric motor 113, but the present invention is not limited thereto. The command value of the rotation speed to the electric motor 113 may be used. In such a case and in the case where the command value of the rotation speed to the electric motor 113 required by the controller 10 is lower than the lower limit rotation speed Nmin, the valve 121 is opened. The electric motor 113 is then controlled at the lower limit rotation speed Nmin, not with the required command value. If the electric motor 113 is controlled at the lower limit rotation speed Nmin, the oil pump 112 for speed change discharges oil of a flow volume greater than the flow volume of leakage in the PRI pulley 41. However, since the valve 121 is opened (S11), some oil is discharged from the valve 121 to the outside of the oil passage 106 for speed change. Therefore, the PRI pulley 41 is compensated for the flow volume of leakage of oil, thereby enabling to suppress the deterioration in control accuracy of the speed ratio.

It is noted that such control based on the rotation speed N may be used in combination with the control based on the oil temperature T shown in FIG. 6, the control based on the PRI pressure P shown in FIG. 9, and the like. In the example described above, the valve 121 is controlled by the controller 10, but the present invention is not limited thereto. The valve 121 may be a mechanical valve which opens and closes according to conditions.

The second embodiment may have one or more of the following effects.

According to the second embodiment, the valve 121 serves as an oil discharge mechanism. In comparison with the case where the orifice 120 is provided, the valve 121 has higher accuracy in controlling whether to discharge oil from the oil passage 106 for speed change, thereby enabling to suppress unnecessary discharging of oil. Therefore, the number of rotation of the engine 1 is enabled to be reduced as a whole, thereby saving energy.

According to the second embodiment, the electric motor 113 has the controllable lower limit rotation speed Nmin. In the case where the oil flow volume of leakage in the PRI pulley 41 is less than the lower limit flow volume Fmin corresponding to the lower limit rotation speed Nmin, the valve 121 is opened. In the example case where the oil flow volume of leakage in the PRI pulley 41 is less than the lower limit flow volume Fmin, if the electric motor 113 is controlled to rotate at the lower limit rotation speed Nmin, the oil pump 112 for speed change discharges oil of a flow volume greater than the flow volume of leakage in the PRI pulley 41. However, since the valve 121 is opened, some oil is discharged from the valve 121. Therefore, the PRI pulley 41 is compensated for the flow volume of leakage of oil, thereby enabling to suppress the deterioration in control accuracy of the speed ratio.

According to the second embodiment, in the case where the oil temperature T is lower than the threshold temperature Tth, the valve 121 is opened. Since oil viscosity increases as an oil temperature T lowers, the oil flow volume of leakage in the PRI pulley 41 decreases. In the example case where the oil temperature T is lower than the threshold temperature Tth, if the electric motor 113 is controlled to rotate at the lower limit rotation speed Nmin, the oil pump 112 for speed change discharges oil of a flow volume greater than the flow volume of leakage in the PRI pulley 41. However, since the valve 121 is opened, some oil is discharged from the valve 121. Therefore, the PRI pulley 41 is compensated for the flow volume of leakage of oil, thereby enabling to suppress the deterioration in control accuracy of the speed ratio.

According to the second embodiment, in the case where the PRI pressure P is lower than the lower limit pressure Pmin, the valve 121 is opened. In the example case where the hydraulic pressure Pa in the PRI pulley 41 is lower than the lower limit pressure Pmin, if the electric motor 113 is controlled to rotate at the lower limit rotation speed Nmin, the oil pump 112 for speed change discharges oil of a flow volume greater than the flow volume of leakage in the PRI pulley 41. However, since the valve 121 is opened, some oil is discharged from the valve 121. Therefore, the PRI pulley 41 is compensated for the flow volume of leakage of oil, thereby enabling to suppress the deterioration in control accuracy of the speed ratio.

According to the second embodiment, in the case where the speed ratio of the continuously variable transmission is constant, the electric motor 113 is controlled according to the oil flow volume of leakage in the PRI pulley 41, so that the position of the piston of the PRI pulley 41 is not changed. At this time, in the case where the electric motor 113 is controlled at a rotation speed lower than the lower limit rotation speed Nmin, the electric motor 113 is controlled at a rotation speed which is an erroneous speed but substantially corresponds to a desired rotation speed, that is, at a rotation speed lower than the lower limit rotation speed Nmin. However, due to the error, it is difficult for the oil pump 112 for speed change to discharge oil of the same flow volume as the flow volume of leakage in the PRI pulley 41.

Accordingly, the electric motor 113 is controlled to rotate at the lower limit rotation speed Nmin, and moreover the valve 121 is opened. In this case, the oil pump 112 for speed change discharges oil of a flow volume greater than the flow volume of leakage in the PRI pulley 41. However, since the valve 121 is opened, some oil is discharged from the valve 121. Therefore, the PRI pulley 41 is compensated for the flow volume of leakage of oil, thereby enabling to suppress the deterioration in control accuracy of the speed ratio. In addition, the discharge of oil is enabled to be suppressed, thereby saving energy.

The present invention is not limited to the above-described embodiments. Naturally, various changes are available within the scope of the technical idea disclosed in the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A continuously variable transmission, comprising:
   a primary pulley hydraulic chamber;
   a secondary pulley hydraulic chamber;
   a first oil passage connected to the secondary pulley hydraulic chamber;
   a second oil passage that is connected to the primary pulley hydraulic chamber, and that branches from the first oil passage;
   an electric oil pump provided on the second oil passage so as to allow oil to flow into and flow out from the primary pulley hydraulic chamber; and
   an oil discharge mechanism configured to discharge oil outside the second oil passage,
   wherein electric oil pump is configured to supply the oil to the primary pulley hydraulic chamber.

2. The continuously variable transmission according to claim 1,
   wherein the oil discharge mechanism is an orifice.

3. The continuously variable transmission according to claim 1,
   wherein the oil discharge mechanism is an openable and closable valve.

4. The continuously variable transmission according to claim 3,
   wherein the electric oil pump has a controllable lower limit rotation speed, and
   wherein the valve is opened when a flow volume of oil of leakage in the primary pulley hydraulic chamber is less than a lower limit flow volume of oil discharged when the electric oil pump rotates at the lower limit rotation speed.

5. The continuously variable transmission according to claim 4,
   wherein the valve is opened when an oil temperature in the second oil passage is lower than a predetermined threshold temperature.

6. The continuously variable transmission according to claim 4,
   wherein the valve is opened when an oil pressure in the second oil passage is lower than a lower limit pressure corresponding to a lowest pressure in a range determined on a basis of a speed ratio.

7. The continuously variable transmission according to claim 4,
   wherein the valve is opened when a rotation speed of the electric oil pump of a case of the speed ratio being constant is lower than the lower limit rotation speed.

8. A control method of a continuously variable transmission for controlling flowing-in and flowing-out of oil with respect to a primary pulley hydraulic chamber by an electric oil pump provided on an oil passage between the primary pulley hydraulic chamber and a secondary pulley hydraulic chamber, the control method comprising:
   supplying oil to the primary pulley hydraulic chamber by the electric oil pump;
   when a flow volume of oil of leakage in the primary pulley hydraulic chamber is less than a lower limit flow volume discharged by the electric oil pump while the electric oil pump rotates at a controllable lower limit rotation speed,
   making the electric oil pump discharge oil of the lower limit flow volume; and
   opening a valve so as to partially discharge oil outside the oil passage,
   wherein the electric oil pump supplies the oil to the primary pulley hydraulic chamber.

\* \* \* \* \*